(12) United States Patent
Kelty et al.

(10) Patent No.: US 7,698,078 B2
(45) Date of Patent: *Apr. 13, 2010

(54) ELECTRIC VEHICLE COMMUNICATION INTERFACE

(75) Inventors: Kurt Kelty, Palo Alto, CA (US); Marc Tarpenning, Woodside, CA (US); Scott Kohn, Menlo Park, CA (US)

(73) Assignee: Tesla Motors, Inc., San Carlos, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 11/779,678

(22) Filed: Jul. 18, 2007

(65) Prior Publication Data

US 2009/0021385 A1      Jan. 22, 2009

Related U.S. Application Data

(63) Continuation-in-part of application No. 11/818,838, filed on Jun. 15, 2007.

(51) Int. Cl.
*G01R 19/00* (2006.01)
*G06F 19/00* (2006.01)
*G06F 17/40* (2006.01)

(52) U.S. Cl. .................. 702/63; 180/65.21; 340/455; 340/636.1; 340/870.07; 701/22; 702/182; 702/187

(58) Field of Classification Search ............... 340/992, 340/425.5, 438, 439, 455, 500, 501, 540, 340/635, 636.1, 636.11, 636.12, 636.13, 340/636.14, 636.15, 636.16, 636.17, 636.18, 340/636.19, 636.2, 679, 870.01, 870.02, 340/870.07, 870.16, 988, 989, 990, 995; 702/188, 1, 33, 34, 57, 60, 63, 127, 182, 702/187, 189; 180/65.1, 65.21, 65.22, 65.265, 180/65.275, 65.28, 65.285, 65.31, 65.8, 199, 180/200, 202, 233, 242; 324/76.11, 158.1, 324/500; 700/1, 9, 11, 17, 83, 90, 286; 701/1, 701/22, 29, 99; 709/217, 218, 219

See application file for complete search history.

(56) References Cited

U.S. PATENT DOCUMENTS 2,883,255 A * 4/1959 Anderson ............... 346/34

(Continued)

*Primary Examiner*—Edward R Cosimano
(74) *Attorney, Agent, or Firm*—Patent Law Office of David G. Beck

(57) ABSTRACT

A method of communicating with an electric vehicle wherein the method includes a step of installing a communication device in the electric vehicle. The method also includes establishing a connection from the vehicle to a network. The methodology also includes controlling and monitoring a battery in the electric vehicle.

20 Claims, 3 Drawing Sheets

U.S. PATENT DOCUMENTS

| | | | |
|---|---|---|---|
| 3,005,411 A * | 10/1961 | Metz | 417/6 |
| 3,147,370 A * | 9/1964 | Lowman | 702/81 |
| 3,472,333 A * | 10/1969 | Loewenstern, Jr. | 180/167 |
| 3,477,538 A * | 11/1969 | Hall et al. | 180/65.1 |
| 3,493,068 A * | 2/1970 | Albright | 180/65.1 |
| 3,497,027 A * | 2/1970 | Wild | 180/65.245 |
| 3,500,167 A * | 3/1970 | Dufendach et al. | 320/132 |
| 3,500,372 A * | 3/1970 | Thiele | 340/517 |
| 3,502,165 A * | 3/1970 | Matsukata | 180/23 |
| 3,522,588 A * | 8/1970 | Clarke, Jr. et al. | 340/825.56 |
| 3,524,121 A * | 8/1970 | Nolan et al. | 322/99 |
| 3,525,874 A * | 8/1970 | Toy | 290/14 |
| 3,529,230 A * | 9/1970 | Tedd | 340/636.16 |
| 5,381,136 A * | 1/1995 | Powers et al. | 340/539.26 |
| 5,642,270 A * | 6/1997 | Green et al. | 363/17 |
| 5,808,469 A | 9/1998 | Kopera | |
| 6,323,775 B1 | 11/2001 | Hansson | |
| 6,625,539 B1 * | 9/2003 | Kittell et al. | 701/213 |
| 6,727,708 B1 * | 4/2004 | Dougherty et al. | 324/427 |
| 6,826,460 B2 | 11/2004 | Kittell et al. | |
| 6,839,597 B2 | 1/2005 | Hattori et al. | |
| 7,078,828 B2 * | 7/2006 | Suzuki | 307/10.3 |
| 7,295,849 B2 * | 11/2007 | Ghabra et al. | 455/502 |
| 7,301,442 B2 | 11/2007 | Kolpasky et al. | |
| 2004/0002836 A1 | 1/2004 | Raichle et al. | |
| 2006/0049922 A1 | 3/2006 | Kolpasky et al. | |
| 2007/0200433 A1 * | 8/2007 | Kelty | 307/66 |
| 2008/0312782 A1 * | 12/2008 | Berdichevsky et al. | 701/22 |
| 2009/0021218 A1 * | 1/2009 | Kelty et al. | 320/137 |
| 2009/0021364 A1 * | 1/2009 | Frey et al. | 340/468 |

* cited by examiner

ELECTRIC VEHICLE COMMUNICATION INTERFACE

This application is a continuation-in-part of pending U.S. patent application Ser. No. 11/818,838 filed Jun. 15, 2007

BACKGROUND OF THE INVENTION

1. Field of the Invention

This subject invention generally relates to a communication interface, and more particularly relates to an electric vehicle communication interface that will allow for communication between the electric vehicle and a user via either a user interface or networks connected to the vehicle.

2. Description of Related Art

The communication to and from internal combustion engine vehicles has been known for years. These internal combustion vehicles include systems that use GPS and/or satellite technology to guide vehicles and send information regarding possible vehicle crashes to a remote location for contacting emergency services and the like. Many modern day vehicles also have internal local area wireless networks, such that cell phones may be used in a hands free by the vehicle user. Many of these other systems rely on cellular communication devices and/or satellite devices to communicate from the vehicle to an external service center or from the vehicle to existing cellular networks or hard line telephones.

However, there is a need in the art for a communication interface for an all electric vehicle (EV) or plug-in hybrid electric vehicle (PHEV), wherein the vehicle operates solely on battery power and does not use an internal combustion engine alone or in combination with a battery to form a hybrid system. Therefore, a communication interface system for a complete plug in electric vehicle that relies exclusively on battery power to propel the vehicle is needed. There also is a need in the art for a communication interface for an electric vehicle or PHEV that will be able to control remotely the charging of the battery and the discharging of the battery to an electric grid if need be. There also is a need in the art for a communication interface for an electric vehicle or PHEV that will notify the user of any potential problems during the charging of the vehicle and potential problems throughout the vehicle environment that will hinder the performance of the battery and hence, the ability of the electric vehicle to travel a predetermined distance of miles. There also is the need in the art for a communication interface for an all electric vehicle wherein the manufacturer of the electric vehicle can contact the user of the vehicle if battery problems arise and if routine maintenance is needed to ensure proper functioning of the systems within the electric vehicle.

SUMMARY OF THE INVENTION

One object of the present invention may be to provide an improved communication interface for an electric vehicle, plug in electric vehicle or plug in hybrid electric vehicle.

Another object of the present invention may be to provide an improved electric vehicle communication interface that is capable of communicating with a first network and then communicating with a second network or a user of the electric vehicle, a utility company, or the manufacturer's server or other communication device.

Still another object of the present invention may be to provide an electric vehicle communication interface that is capable of communicating predetermined instructions from the user to the electric vehicle regarding the battery and charging thereof.

Still another object of the present invention may be to provide an electric vehicle communication interface where the user can be notified by the vehicle of problems with the battery during charging or when the battery is fully charged and ready for use.

Yet another object of the present invention may be to provide an electric vehicle communication interface that will allow the user to pre-register with local utility companies and energy providers to control the timing of charging of the vehicle such that charging occurs during low power consumption times at a lower cost to the vehicle user.

Still another object of the present invention may be to provide an electric vehicle communication interface that will prompt the user after driving and turning off of the electric motor to choose a predetermined charging option prior to using the vehicle again for driving.

Still another object of the present invention may be to provide an electric vehicle communication interface capable of transferring predetermined data from an electric vehicle to the manufacturer's server to create a database of user data to ensure proper operation of the electric vehicle and associated batteries.

To achieve the foregoing objects, an electric vehicle communication interface for providing a methodology of communicating with an electric vehicle is disclosed. The methodology includes installing a communication device in the electric vehicle and establishing a connection from the vehicle to a network. The methodology also includes contacting a user interface device via the network and controlling and monitoring a battery in the electric vehicle.

One advantage of the present invention may be that it provides a novel and improved electric vehicle communication interface.

Still a further advantage of the present invention may be that it provides an electric vehicle communication interface that is capable of communicating between a first network and then a second network, user, utility or server of a manufacturer of the electric vehicle.

Still another advantage of the present invention may be that it provides an interface that will allow for communication between the user and the vehicle to enable the user to control certain aspects of charging of the battery, initiation of heating and cooling of the battery and discharging of the battery to an electric grid if necessary.

Still another advantage of the present invention may be that it provides an electric vehicle communication interface that allows for the vehicle to notify the user when the battery is fully charged or if a problem has occurred during charging thus affecting the operability of the electric vehicle.

Still another advantage of the present invention may be that it provides for a method of creating a database on the manufacturer's server to ensure proper maintenance and operation of the electric vehicle.

Still another advantage of the present invention may be that it provides for the user to pre-register with a local utility company or energy provider to allow for charging of the vehicle at periods of low power consumption, thus reducing the overall cost of operating the electric vehicle.

Still another advantage of the present invention may be that it provides the ability to pre-register with the local utility to allow for discharging of the vehicle at periods of high electrical demand, or charging at periods of low demand. It can also provide the necessary information about state of charge, battery aging, and user driving needs to allow the utility to compensate the user for wear on the battery, or collect payment from the user for charging the battery.

Still another advantage of the present invention may be that it will allow for predetermined charging options to be chosen by the user of the vehicle when the user turns the motor off after each driving situation.

Yet another advantage of the present invention may be that it has the ability to contact the manufacturer's network at predetermined intervals to allow for the user data to be analyzed for vehicle efficiency purposes.

Other objects, features, and advantages of the present invention will become apparent from the subsequent description and the appended claims, taken in conjunction with the accompanying drawings.

DESCRIPTION OF THE EMBODIMENT(S)

Figure 1:
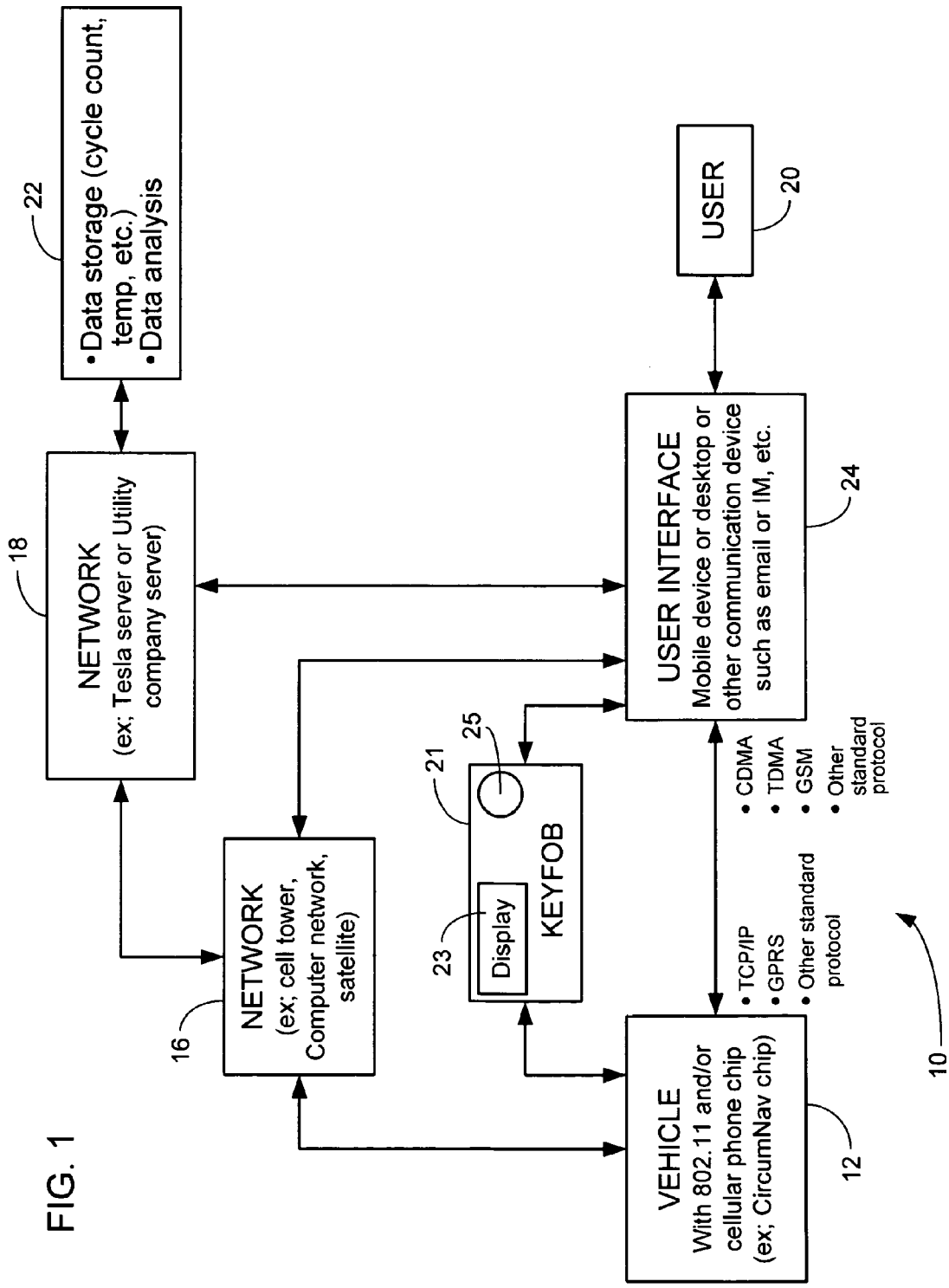
FIG. 1 is a schematic view of an electric vehicle communication interface and associated methodology according to the present invention.

Referring to the drawings, an electric vehicle communication interface 10 is disclosed. The electric vehicle communication interface 10 is for use in any type of vehicle including an automobile, boat, train, plane, or any other transportation vehicle. However, it is specifically designed for use in an all electric vehicle 12. The all electric vehicle 12 will operate completely on battery power for all propulsion and other automotive related needs. The electric vehicle 12 of the present invention uses a battery pack made of sheets of cells of lithium ion batteries arranged in a predetermined pattern. This battery pack will allow for propulsion of the electric vehicle 12 some distance before recharge is necessary. It should also be noted that the electric vehicle communication interface 10 of the present invention may be used in any other type of automotive vehicle, such as internal combustion, hydrogen cell vehicle, hybrid vehicle, alternate fuel type vehicle, or any other type of compulsion system known for a vehicle. It should also be noted that the electric vehicle communication interface may be completely wireless or include hard wire portions for use in connecting components as described herein.

Figure 2:
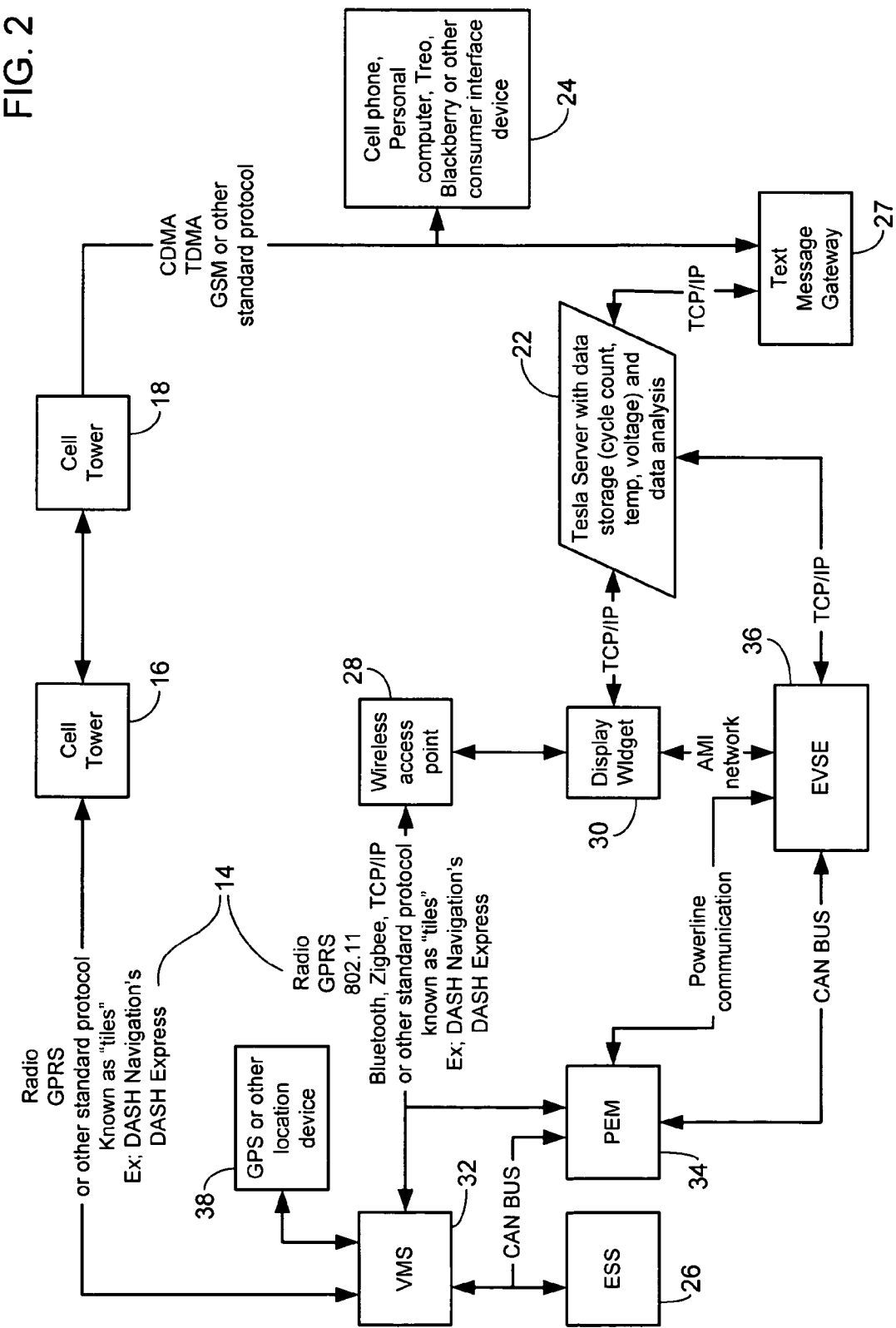
FIG. 2 is a flow chart showing the electric vehicle communication interface according to the present invention.
Figure 3:
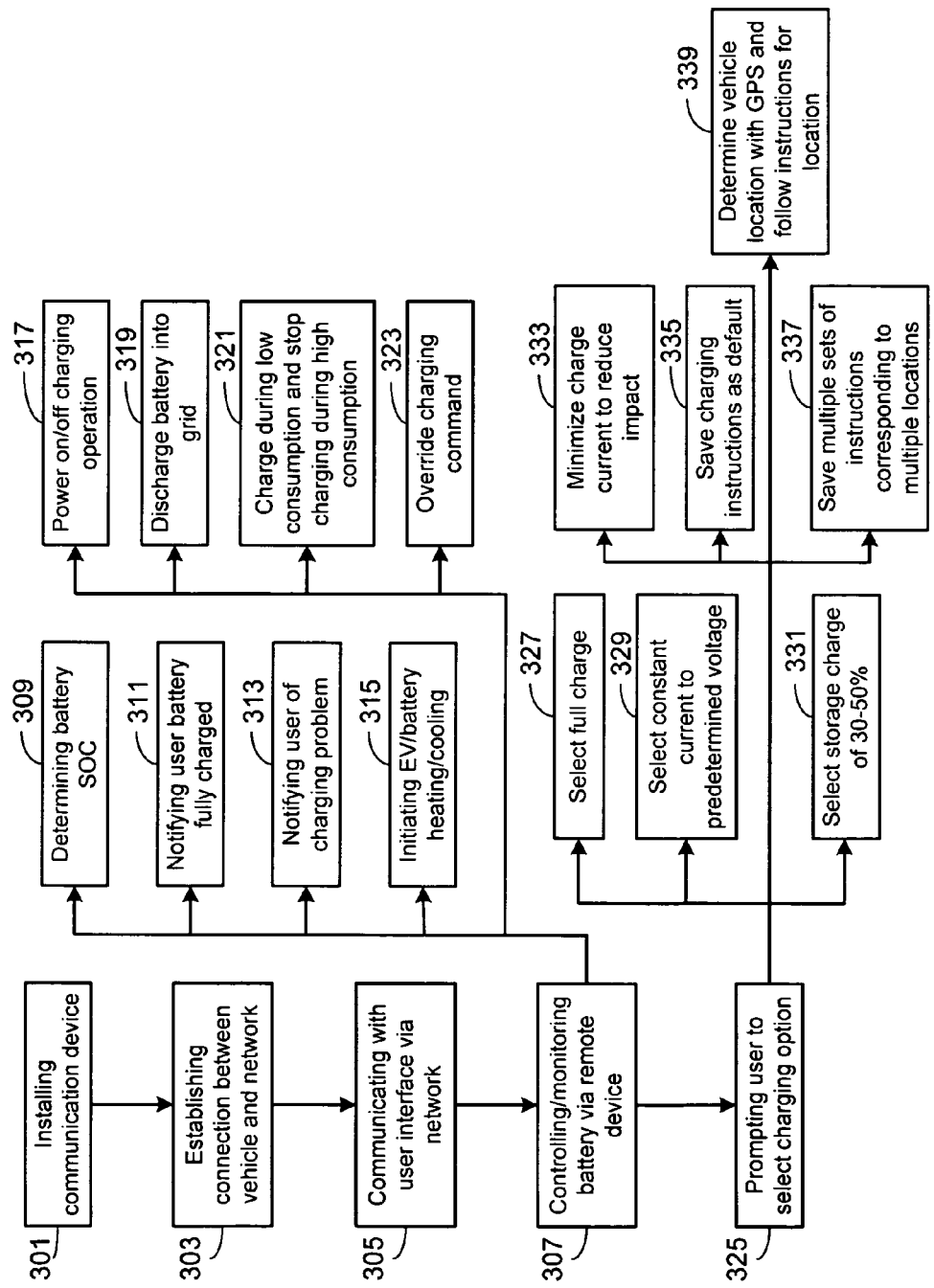
FIG. 3 illustrates the methodology of an embodiment of the invention.

FIGS. 1 and 2 show the electric vehicle communication interface 10 according to one contemplated embodiment of the present invention. FIG. 3 shows steps associated with the methodology of at least one preferred embodiment of the present invention. It should be noted that other contemplated embodiments for the connections necessary for the electric vehicle communication interface 10 may be possible. The electric vehicle communication interface 10 generally includes a communication device 14 arranged and installed within the electric vehicle 12 (step 301). The communication device 14 may be installed in any predetermined position within the electric vehicle 12 and may also be incorporated into the computer controlling the vehicle internal network. However, the communication device 14 may also be a stand alone device depending on the device requirements and environment in which the electric vehicle 12 will be used. Generally, the communication device 14 is a communication chip which may use an 802.11 protocol, cellular or other standard protocol which are all well known in the art. In one specific embodiment a communication chip 14 developed by Circum-Nav Network may be used for the communication device 14 of the present invention. The electric vehicle 12 uses a communication chip 14 that is capable of communicating via any known protocol such as TCP/IP, GPRS, or any other standard protocol. The communication chip 14 allows for communication with a network 16 (step 303) that may be cellular, internet, satellite or any other type of network or with a wired or wireless access point 28. After the initial communication with network 16 the methodology then sends a communication from the network 16 to a second network 18 or to the user or driver 20 of the vehicle, or to a utility company or the manufacturer of the electric vehicle communication hub or server 22. The second network 18 may include a manufacturer server or utility company server or any other known type of network while the first network 16 may include any cell tower, computer network, satellite system or hard line such as a phone network or power line network. The user 20 will be capable of communicating with either the first network 16, the second network 18 or directly with the vehicle 12 via any user interface device 24 (step 305). Contemplated user interface devices 24 may include but are not limited to mobile devices, such as cell phones, PDA's, handheld devices, desktop computers, laptop computers or any other communication device that is capable of producing email, IM, or any other communication device that is well known in the art. Some of these communications between the user interface devices 24 and either the first and second network 16, 18 or the vehicle 12 may be performed via the code division multiple access standards (CDMA), the time division multiple access standards (TDMA), the global system for mobile communication standards (GSM), 802.11, BlueTooth, ZigBee, powerline communications including but not limited to HomePlug or Lonworks, a proprietary or standard communications protocol overlaid on existing charging communications equipment, a standard protocol such as CAN implemented on a custom physical layer, or any other standard protocol that is known in both wireless and hardwired configurations, for communication between any of the known user interface devices 24 and the first and second network 16, 18 or the electric vehicle 12 directly.

If the 802.11 standard is chosen for use in the electric vehicle 12, the user 20 of the vehicle may then need to install and use a wireless router or any other known wireless access point 28 to enable the router to accept login from the electric vehicle 12 to allow for communication between the user interface device 24 and the electric vehicle communication chip 14 which operates on the 802.11 standard. It should be noted that with the other standards or protocols contemplated for use, other specific needs such as wireless router, hardwired connections, or the like may be needed and are all contemplated for use if necessary depending on the design requirement of the electric vehicle communication interface 10 as used in the electric vehicle 12.

The use of the communication chip 14 as described above in the electric vehicle 12 may allow for communication to the first network 16 to allow for the vehicle 12 to contact the user 20 via the user interface device 24 by any known mobile device or desktop, laptop, etc., via either email, instant messaging or any other known communication protocol. Also, it should be noted that the user or driver 20 of the vehicle is also capable of communicating with the electric vehicle 12 from their portable device such as a cell phone, PDA, laptop, personal computer, server, any known text messaging device, any known display device located at any known location or any other communication device either directly with the vehicle 12 or through the first and second networks 16, 18 to the vehicle to program and send specific instructions to the electric vehicle 12 for controlling and monitoring the battery system 26 arranged within the electric vehicle 12 (step 307). Such portable communication devices may be placed in a home or at another location of the user 20, 50 the user 20 may check or change the charge status and settings or other vehicle parameters. This communication between the electric vehicle 12 and user 20 or user 20 and electric vehicle 12 enables a plurality of scenarios through which the communication will have specific functions with respect to the propulsion system and other internal components of the electric vehicle 12. In one contemplated controlling methodology for the communication interface 10, the user 20 may be capable of querying or monitoring the electric vehicle's battery pack and cells 26 for its state of charge (SOC) (step 309). This will allow the user 20 to determine if the battery 26 is capable of driving the distance the user 20 must travel, if the battery 26 has not been charging or if the battery 26 is charged to the level set by the user and capable of a maximum mileage trip based on the battery installed therein. Another contemplated methodology will have the electric vehicle 12 notifying the user or driver 20 that the battery 26 is fully charged (step 311) and is ready for driving. Yet another methodology contemplated will have the vehicle 12 notifying the user or driver 20 that a problem occurred during charging of the battery 26 (step 313) and that the maximum distance for travel for the electric vehicle 12 has been reduced or that the electric vehicle 12 needs immediate servicing and is not available for driving at the present time. Still yet another methodology contemplated for the electric vehicle communication interface 10 for the present invention will have the user or driver 20 of the electric vehicle requesting the electric vehicle 12 to initiate heating or cooling of the vehicle 12 along with initiate heating or cooling of the battery cells and associated battery pack 26 to prepare for driving of the electric vehicle 12 (step 315). This preparation may include adjusting the battery temperature based on the distance of the expected drive, the external temperature that the electric vehicle 12 will be used in, the weather in which the electric vehicle will be driven and/or any other parameters that effect the performance and durability of the battery 26 and hence the electric vehicle 12 in the driving environment. Still yet another methodology contemplated for use in the communication interface 10 of the present invention may have the user 20 capable of powering on and off in predetermined cycles and at predetermined times the charging of the battery 26 from a user interface device 24 (step 317). Furthermore, the user 20 may be capable of discharging the battery 26 into the electricity or electric grid (step 319) of the locale in which the electric vehicle 12 is either charged or stored via a vehicle to grid application that will allow for communication between a local utility company server and the electric vehicle 12, thus allowing for certain operations to be performed by the utility company and the user 20 on the electric vehicle 12. Yet another use would be to alert the user or manufacturer that the battery 26 is falling below the minimum accepted storage levels (3.0V for example). Such discharge of the battery 26 may allow the user to plug in the vehicle or recharge the battery 26 by other means to preserve the battery 26.

The vehicle to electricity grid applications and methodology may allow for the user 20 to either pre-register or associate with a local utility company or energy provider which will allow for the utility company to control the timing of charging or discharging of the electric vehicle 12. This will allow the utility company during periods of high power consumption to have the option of turning off the charging of the electric vehicle 12 to help reduce the load on the electric grid controlled by the utility company and to avoid the sometimes necessary rolling blackouts (step 321). This also may allow for charging the vehicle 12 during periods of low power consumption by having the utility company to turn the charging of the electric vehicle 12 back on thus reducing the overall cost of operating the electric vehicle 12 by allowing for charging of the vehicle during periods of low power consumption which may result in lower kilowatts charges to the user of the electric vehicle 12 (step 321). It should be noted that the user 20 through the electric vehicle communication interface 10 and associated methodologies may be capable of having a preset operating command to automatically reject or accept such charging control or request for such from the utility company. This methodology would allow for the user 20 to override the utility company instruction of stopping charging (step 323) because of high power consumption if the user 20 of the electric vehicle 12 needs the battery 26 charged at the current time in order to use the vehicle in the near future. It is contemplated that this type of mutual control between the utility company and the electric vehicle 12 may be executed via the internet using the 802.11 communication protocol or cell phone communication with the electric vehicle 12 by the user 20 or the utility company. It should also be noted that it is contemplated within this methodology that the utility company may also be capable of remotely querying and sampling the electric vehicles state of charge for the associated battery pack 26 and then send predetermined and specific instructions or requests to the electric vehicle and/or user to discharge electricity back into the grid via the vehicle to grid applications stored within the electric vehicle communication interface 10. This will allow the user 20 to further reduce its cost by discharging electricity back into the electric grid of the utility company and hence receiving credits and the like.

The electric vehicle communication interface 10 also may include an in vehicle display 30 which may be any known display touch screen, screen, TV, tube or any other type of display device known. The dashboard display 30 may be arranged in any part of the vehicle 12 including but not limited to sun visors, heads up displays, anywhere in the instrument panel, anywhere in the seats, or any other position within the vehicle and it is even contemplated to have a touch screen on the outer surface of the vehicle. When the user or driver 20 of the electric vehicle 12 turns off the motor of the electric vehicle 12, the user 20 may be prompted via the display device 30 in the vehicle 12 to choose or select one of a plurality of predetermined charging options for the electric vehicle battery pack 26 (step 325). It should be noted that the user 20 may also use a menu or voice controlled device that allows for selection of a next charge state at any time during use of the vehicle. In one contemplated embodiment there will be three separate charging options which will be displayed on the touch screen 30 display located in the vehicle's interior compartment. These charging options may include a boost charge which in theory is a full charge to the battery 26 of the electric vehicle 12 (step 327). By selecting the boost charge, the user 20 will be able to have maximum driving range such that the next time the user drives the electric vehicle 12 they can travel the maximum distance capable from the electric vehicle, however the boost charge may affect the durability and battery life of the battery pack 26 in the electric vehicle 12 over time. The second charging option displayed to the user or driver 20 of the electric vehicle 12 will be the regular charge option. The regular charge option generally will deliver a constant current charge up to a predetermined set voltage (step 329). The predetermined set voltage will be determined based on the battery pack system 26 and the configuration of the battery pack therein. It should be noted that a taper charge will not be used during the regular charge, which will result in the battery 26 not being completely charged after the regular charge option is chosen by the user. However, the regular charge will benefit the driver/user 20 of the vehicle 12 by allowing a quicker charge of the battery 26 and prolong battery life of the battery pack 26 in the electric vehicle 12. However, the driving range will be reduced by a predetermined amount when selecting the regular charge option. In one contemplated embodiment the driving range will be reduced by about 4 to 10%. However, the reductions may generally be anywhere from 2% to 30% depending on the design requirements and batteries therein. The third option for one contemplated embodiment for charging of the battery pack 26 of the electric vehicle 12 will be a storage charge. This will allow the user 20 of the vehicle that does not plan to use the vehicle on a regular basis to maximize the life of the battery pack 26. Generally, the storage charge is approximately a 30 to 50% charge (step 331). However, it should be noted that a range of 10 to 70% charge may also be used depending on the design requirements and environment in which the electric vehicle will be used. The storage charge will allow for the maximum life and durability of the battery pack system 26 in the electric vehicle 12.

It should also be noted that the charging options may also include within its methodology a follow up menu that will allow the user or driver 20 of the vehicle 12 the choice of setting one of the predetermined charging options as the default such that every time the user exits the vehicle and begins charging of the battery pack 26 within the electric vehicle 12 such setting will be automatically used for charging thereof. It should also be noted that the methodology of charging options as discussed above may also be added to a keyfob or remote keyless entry device 21 such that the options are capable of being chosen via a keyfob 21 that comes with the electric vehicle 12. The keyfob 21 also may display the charge status of the battery pack by either a visual means 23 or audible means. The vehicle user 20 may also control the starting and stopping of charging of the battery pack via the means 25 of keyfob along with other communication and control of the electric vehicle 12. Furthermore, the options may also be added to a cell phone connection or other mobile device to follow the network connections of the first and second network 16, 18 as described above to allow for choosing of one the charging options and setting any default via any user interface device 24.

The communication chip 14 using the GPRS, which is a general packet radio service protocol, 802.11 standard, TCP/IP or any other standard protocol may communicate with a vehicle management system 32 which is the onboard computer that monitors, controls and coordinates various systems in the electric vehicle 12 including the power electronics module 34, the energy storage system (ESS) 26 and the HVAC system along with the user interface 24. The communication chip 14 may also communicate with the wireless access point 28 or the power electronics module 34. The energy storage system (ESS) 26, which is controlled by the vehicle management system 32 via a CAN BUS or any other known communication interface or path, includes the battery pack of the electric vehicle 12 which is used to provide the power necessary to propel the electric vehicle 12 without the need for an internal combustion engine. The power electronics module 34 which is also controlled by the vehicle management system 32, will house a DC to AC inverter for a traction motor, a AC to DC rectifier for charging and the control PCB's for drive and charge of the electric vehicle energy storage system. The power electronics module 34 may also be in communication with an electric vehicle service equipment module 36 via power line communication, CAN BUS or any other known communication method, which also may be in communication with the display device 30 of the electric vehicle 12. This will allow for any messages to be communicated to the user of the vehicle via the display device 30 within the vehicle. These messages may include service, appointments, or other tips to improve the mileage and efficiency of the battery pack 26 within the electric vehicle 12.

A further component of the methodology used in the electric vehicle communication interface 10 will allow for the electric vehicle 12 every time it comes into contact with the home network of the manufacturer of the electric vehicle 12 or any other open network that it will send a message automatically through the communication chip 14 and over any known protocol such as the 802.11 standard to the manufacturers server 22 which may be networked to as described above. The server 22 may also be in communication with the display device 30, the electric vehicle service equipment 36, or the text message gateway 27. The manufacturer may then be capable of forming a database of the user data such that the data storage will be held separately on the manufacturers server and will allow for cycle count, temperature, and other necessary data to be stored and evaluated or monitored to ensure efficient operation of the battery pack system and energy storage system within the electric vehicle 12. The manufacturer's server 22 also may be capable of data analysis regarding the charging cycles of the battery, miles driven per charge, temperature of the batteries, and any other data that is relevant to the efficient operation of the electric vehicle 12. Therefore, every time the electric vehicle 12 comes in contact with a home network or other open network as described above it will automatically send, via a network, data to the manufacturer's server 22 from the vehicle 12, battery pack and energy storage system 26. It should be noted that the communication protocol methodology will give the user or driver 20 of the electric vehicle 12 the option of disabling the automatic messaging to the manufacturer's server 22 via the vehicle display touch screen or via programming by a user interface device 24 on the internet or the like. It is also contemplated that upon initial programming of the vehicle 12 the user 20 may be able to set a default for either enabling or disabling the automatic message function. It should also be noted that it is contemplated that the methodology will allow the user or driver of the vehicle to access this data from the manufacturers server 22 via a portable hand held device or personal computer if necessary. It should also be noted that the manufacturer may use this data to broadcast specific messages to the user or driver 20 through the onboard communication chip 14 or through a cellular connection which will allow for displaying on the dashboard touch screen device 30. These messages that may be shown on the display 30 may include servicing requirements or tips to increase the efficiency of the vehicle 12, such as checking tire pressure, battery temperature and the like.

It is also contemplated to have a methodology that allows the driver or user 22 of the electric vehicle 12 who periodically travels to a second home or other location to automatically be able to choose the boost charge or extended charge whenever they go to the second home, which is located a predetermined distance from their first home location. It is contemplated that this methodology may also use an onboard location device, such as a global positioning satellite or system (GPS) or the like, in the vehicle 12 to automatically identify that the user 20 has stopped or parked at a second home or location and automatically follow the saved preset charging instructions if not overridden by a new setting or user 20 action. Furthermore, the methodology may be capable of determining that if the cost of electricity may be higher at the second location that the user 20 of the vehicle 12 may want to charge at a different time of day at that second location to reduce their cost of charging the battery pack of the electric vehicle 12. Furthermore, they may also want to do the boost charge just prior to leaving for the second home such that intermediate driving which may reduce the range of the electric vehicle 12 does not occur before traveling to the second home or location that is predetermined and stored in the user interface 24. This methodology may be implemented with the following steps on the user interface screen located in the electric vehicle 12 or remotely at a computer, PDA, keyfob or the like. The first step of the methodology would ask if the user 20 wants to initiate a storage, regular or boost charge. The next step of the methodology would then ask the user 20 if they want to delay the charge until the electricity rates are reduced which generally occurs at night time or other predetermined times as notified by the utility server of a utility company. Next the methodology would query if the user 20 wants to minimize the charge current which would have less impact on the household appliances of either the first or second home at which the electric vehicle 12 is being charged (step 333). Then the methodology may query if the user 20 wants to save these answers as a default for the second house location or second remote location that the electric vehicle 12 will be used at (step 335). Therefore, this methodology will allow for a separate set of parameters to be stored for a second house or second location at which the electric vehicle 12 may be used by the user 20 on a generally regular basis (step 337). The methodology may also use a GPS device 38 with the vehicle 12 to identify and store the other locations. When the GPS device 38 determines that the vehicle 12 is at the second or one of the other stored locations it will automatically follow the preset charging routine relating to such location (step 339) unless such preset routine is overridden by a new setting or user 20 actions. It is also contemplated to have multiple locations storable on the interface 10, with such information as described above, so users 20 who have multiple homes or locations at which the electric vehicle 12 may regularly be used, stored or located at for a predetermined amount of time have preset parameters for charging and other vehicle functions available for each separate location.

Therefore, the above electric vehicle communication interface 10 has been described in one contemplated embodiment, however it should be noted that other contemplated embodiments and other methodologies that will allow for communication between the electric vehicle 12 and the user 20 and the passing of commands and monitoring of systems between the user 20 and the electric vehicle 12 and the manufacturer of the vehicle 12 are also contemplated and can be used in the scope of the electric vehicle communication interface 10 invention as described herein.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of communicating with an electric vehicle, said method including the steps of:
   installing a communication device in the electric vehicle;
   establishing a connection from the vehicle to a network;
   communicating with a user interface via said network; and
   controlling and monitoring a battery in the electric vehicle via a device remote from the electric vehicle.

2. The method of claim 1 wherein said communication device is a chip using an 802.11, cellular, powerline communication, or other standard or custom protocol.

3. The method of claim 1 wherein said step of controlling and monitoring includes determining the battery state of charge.

4. The method of claim 1 wherein said step of controlling and monitoring includes the vehicle notifying a user that the battery is fully charged.

5. The method of claim 1 wherein said step of controlling and monitoring includes the vehicle notifying a user if charging problems occurred.

6. The method of claim 1 wherein said step of controlling and monitoring further includes the step of a user initiating heating or cooling of the vehicle or the battery to prepare for driving of the vehicle.

7. The method of claim 1 wherein said step of controlling and monitoring includes a user powering on or off a charging of the battery.

8. The method of claim 1 wherein said step of controlling and monitoring includes a user discharging the battery into an electricity grid.

9. The method of claim 1 wherein said step of controlling and monitoring further includes charging during low power consumption periods, stopping charging during high power consumption periods and providing for a user override of charging commands from a third party from a keyfob or remote keyless entry member.

10. The method of claim 9 further including the step of prompting a user of the vehicle to choose a predetermined charging option when the vehicle is turned off.

11. The method of claim 10 wherein said step of prompting includes predetermined charging options of a full charge, a constant current charge up to a predetermined voltage, and a storage of 30 to 50% charge.

12. The method of claim 11 further including a step of determining if the user wants to minimize charge current to reduce impact on household appliances.

13. The method of claim 12 further including a step of determining if the user wants to save charging instructions as a default for a predetermined location.

14. The method of claim 13 wherein multiple location charging instructions may be saved by the user interface for multiple homes or business locations.

15. The method of claim 14 further including a step of determining said location of the vehicle via a GPS device and automatically following said saved charging instructions for said predetermined location.

16. An apparatus for connecting an electric vehicle, having a battery pack for solely propelling the electrical vehicle, with a user of the vehicle, the manufacturer of the vehicle or an utility company, said apparatus including:
   a communication chip located in the vehicle;
   a first network in communication with said chip;
   a second network in communication with said first network;
   a data storage and data analysis device in communication with said second network;
   a user interface device in communication with said chip, said first network or said second network; and
   a remote device in communication with the vehicle and said user interface device.

17. The apparatus of claim 16 said user interface storing multiple charging instructions for the battery pack at multiple predetermined locations the vehicle may be located on a generally regular or irregular basis.

18. The apparatus of claim 16 wherein said remote device is a keyfob or remote keyless entry device.

19. The apparatus of claim 18 wherein said keyfob controls a starting or stopping of a charging of the battery pack.

20. An apparatus for connecting an electric vehicle, having a battery pack for solely propelling the electrical vehicle, with a user of the vehicle, the manufacturer of the vehicle or an utility company, said apparatus including:

a communication chip located in the vehicle;

a first network in communication with said chip;

a second network in communication with said first network;

a data storage and data analysis device in communication with said second network;

a user interface device in communication with said chip, said first network or said second network; and a keyfob or remote keyless entry device in communication with the vehicle and said user interface device, said keyfob displays a charge status of the battery pack.

\* \* \* \* \*